(12) United States Patent
Geist et al.

(10) Patent No.: US 11,745,608 B2
(45) Date of Patent: Sep. 5, 2023

(54) CONNECTOR SYSTEM FOR CONDUCTIVE CHARGING OF ELECTRIC VEHICLE

(71) Applicant: Electric Power Research Institute, Inc., Palo Alto, CA (US)

(72) Inventors: Thomas D. Geist, Knoxville, TN (US); Doni J. Nastasi, Knoxville, TN (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 1 day.

(21) Appl. No.: 17/527,759

(22) Filed: Nov. 16, 2021

(65) Prior Publication Data
US 2022/0355682 A1 Nov. 10, 2022

Related U.S. Application Data

(60) Provisional application No. 63/185,600, filed on May 7, 2021.

(51) Int. Cl.
| | | |
|---|---|---|
| *B60L 53/16* | (2019.01) | |
| *H01R 13/629* | (2006.01) | |
| *B60L 53/35* | (2019.01) | |
| *H02J 7/00* | (2006.01) | |
| *H01R 13/62* | (2006.01) | |
| *B60L 53/10* | (2019.01) | |

(52) U.S. Cl.
CPC .............. *B60L 53/16* (2019.02); *B60L 53/35* (2019.02); *H01R 13/6205* (2013.01); *H01R 13/629* (2013.01); *H02J 7/0042* (2013.01); *B60L 53/11* (2019.02)

(58) Field of Classification Search
CPC ..... B60L 53/16; H01R 13/6205; H02J 7/0042
USPC ........................................................ 320/109
See application file for complete search history.

(56) References Cited

U.S. PATENT DOCUMENTS

| | | |
|---|---|---|
| 2,234,982 A | 3/1941 | Ross |
| 3,810,258 A | 5/1974 | Mathauser |
| 5,941,729 A | 8/1999 | Sri-Jayantha |
| 6,042,385 A | 3/2000 | Watanabe et al. |
| 6,183,264 B1 | 2/2001 | Harsányi |
| 6,528,746 B2 | 3/2003 | DeWitt et al. |
| 7,311,526 B2 | 12/2007 | Rohrbach et al. |
| 10,071,641 B2 | 9/2018 | Ricci |
| 10,099,566 B2 | 10/2018 | Wu et al. |
| 10,112,498 B2 | 10/2018 | Hill et al. |
| 10,153,589 B2 | 12/2018 | Widegren |
| 10,286,793 B2 | 5/2019 | Paryani et al. |
| 10,286,799 B2 | 5/2019 | Namou et al. |
| 10,328,813 B2 | 6/2019 | Daniel et al. |
| 10,343,537 B2 | 7/2019 | Widmer et al. |
| 10,384,553 B2 | 8/2019 | Sarkar et al. |
| 10,576,833 B2 | 3/2020 | Malek et al. |
| 10,604,021 B2 | 3/2020 | Brown |
| 10,625,611 B2 | 4/2020 | Lord et al. |
| 2011/0074351 A1* | 3/2011 | Bianco ............... B60L 53/31 320/109 |
| 2018/0086219 A1* | 3/2018 | Malek ............... B60L 53/305 |
| 2020/0072972 A1* | 3/2020 | Liu ................. G06V 10/60 |
| 2020/0254893 A1* | 8/2020 | McColl .............. B60L 53/16 |

(Continued)

*Primary Examiner* — Suchin Parihar
(74) *Attorney, Agent, or Firm* — Luedeka Neely Group PC

(57) ABSTRACT

An electrical connector apparatus that magnetically aligns electrical contacts in a suspended magnetic connector with mating electrical contacts in a vehicle magnetic connector and holds the connectors together during an electric vehicle charging process.

20 Claims, 4 Drawing Sheets

(56) References Cited

U.S. PATENT DOCUMENTS

| | | | |
|---|---|---|---|
| 2021/0114476 A1* | 4/2021 | Spaninks | B60L 53/16 |
| 2021/0138919 A1* | 5/2021 | Weber | H01R 13/6205 |
| 2021/0347274 A1* | 11/2021 | Kadoko | B60L 53/14 |
| 2022/0001761 A1* | 1/2022 | Cole | G06V 10/143 |
| 2022/0055491 A1* | 2/2022 | Labell | H01R 13/629 |
| 2022/0055495 A1* | 2/2022 | Labell | B60L 53/37 |
| 2022/0144107 A1 | 5/2022 | Erikson et al. | |

* cited by examiner

CONNECTOR SYSTEM FOR CONDUCTIVE CHARGING OF ELECTRIC VEHICLE

FIELD OF THE INVENTION

The present invention relates to charging of electric vehicles while parked in residential garages.

BACKGROUND

Presently, the state of the art for charging electric vehicles (EV) in residential garages is a conductive AC supply apparatus including a cable and connector. The vehicle begins charging after the operator manually inserts the connector of the supply apparatus into a mating connector on the vehicle. While the supply apparatus is attached to the vehicle, the body of the connector and the cable extend outward on at least one side of the vehicle. Additionally, a length of cable is either coiled on the floor or hangs above the floor to bridge the space between an electrical outlet and the vehicle. The result is a restriction of movement around the vehicle, which is not only an inconvenience, but also presents a tripping hazard and the potential to bump into the connector, causing damage both to it and to the vehicle. Further, the connector must be manually detached when the operator intends to drive the vehicle. After detaching the connector, the operator typically has to stow it and a length of cable to prevent damage and to avoid leaving behind a tripping hazard.

Other inconveniences of manually-operated connections include: (1) the operator often has to carry goods from the vehicle, leaving no hands free to connect the supply apparatus to the vehicle; (2) the operator having to touch and stow a charging cable, which is often dirty from the detritus on the floor of the garage; and (3) the operator may forget to connect the supply apparatus to the vehicle, which may negatively affect the next commute.

What is needed, therefore, is hassle-free EV supply equipment (EVSE) that eliminates tripping and breakage hazards associated with traditional EV charging equipment in the home, while improving convenience and eliminating the possibility of the operator forgetting to connect the supply apparatus to the vehicle.

SUMMARY

A preferred embodiment of the solution described herein provides all the functions of existing EVSE, but replaces the manually mated connectors with a hassle-free connector system. As the term is used herein, "hassle-free" refers to a connector system in which the connector on the charging cable makes at least an initial connection to a mating connector on the vehicle automatically, with little or no manual intervention by an operator. In some preferred embodiments, the hassle-free connector system is a magnetically-secured mating system. The AC supply apparatus is preferably mounted to the garage ceiling and a magnetic connector with down-ward facing electrical contacts is suspended therefrom such that it provides a visual alignment process to aid the vehicle driver, while parking, to align the suspended connector (also referred to herein as the suspended magnetic connector) to the vehicle's mating connector (also referred to herein as the vehicle magnetic connector) which has upward-facing electrical contacts. Once in proximity, magnetic attraction connects the suspended magnetic connector of the supply apparatus to the vehicle magnetic connector. Charging begins automatically when the vehicle is parked and connected. In the preferred embodiment, charging is terminated when the operator either manually disconnects the magnetic connectors or takes the vehicle out of park.

The system described herein has the following features and advantages over prior EV charging systems:
- compatible with existing charging protocols, including DC fast charging and existing AC Level 1 and Level 2 charging equipment;
- eliminates physical intervention and is therefore more convenient;
- reduces the risk of injury and property damage by eliminating a tripping hazard and a bumping hazard in household garages;
- improves access and egress around a charging vehicle;
- reduces the risk of breaking the charging connector; and
- improves the EV ownership experience which will accelerate the adoption of EVs, thus increasing the beneficial effects of EVs.

In one aspect, some embodiments of the invention are directed to a process for assisting an EV driver to align a vehicle magnetic connector with a suspended magnetic connector while driving the vehicle into a garage.

In another aspect, various embodiments of the invention described herein are directed to an apparatus for safely and accurately aligning and mating a vehicle magnetic connector with a suspended magnetic connector.

In some embodiments, the apparatus comprises an electrical circuit for detecting proper contact of the suspended magnetic connector and the vehicle magnetic connector. The electrical circuit preferably verifies electrical contact through a pre-charge check of ohmic contact resistance in the current-carrying conductors and the safety ground conductor.

In some embodiments, the apparatus includes a visual and/or audible connection status indicator to alert the driver, while parking the vehicle, of properly mated connector status. The connection status indicator may be integrated into a vehicle dashboard and/or vehicle audio system, or it may be provided at the suspended magnetic connector.

In some embodiments, the apparatus includes a visual and/or audible charge status indicator to alert that charge current is flowing. The charge status indicator may include an alarm indicating that charging has failed.

In some embodiments, the apparatus includes a safety circuit to interrupt charging if the contacts in the suspended magnetic connector or vehicle magnetic connector are heating beyond an expected range.

In some embodiments, the apparatus includes a detection circuit that interrupts charging if the suspended magnetic connector or vehicle magnetic connector are physically bumped, so as to prevent sparking and the exposure of live conductors that would otherwise result when the connectors separate.

In some embodiments, power for charging is provided by a power outlet in the ceiling of a garage in which the apparatus is installed.

In some embodiments, the suspended magnetic connector is on a suspended cable that includes an inline plug-in-socket electrical connector that mechanically disconnects if a downward pulling force is applied to the suspended magnetic connector.

In some embodiments, the apparatus includes an actuated cover for the vehicle magnetic connector that automatically closes to protect the vehicle magnetic connector from the weather when not connected to the suspended magnetic connector.

In some embodiments, the apparatus includes a fault current limiting circuit disposed within the vehicle physically close to the vehicle OEM charge port as a safety measure.

In some embodiments, the apparatus includes a charge port selection circuit for selecting a vehicle OEM charge port on the vehicle as the primary charging port, and for selecting the vehicle magnetic connector as a secondary charging port only when it is in use, thereby preventing the simultaneous use of both charging ports on the vehicle. In one embodiment, the charge port selection circuit uses the position of the vehicle OEM charge port door as an input.

In another aspect, various embodiments of the invention described herein are directed to an electrical connector apparatus that magnetically aligns electrical contacts in a suspended magnetic connector with mating electrical contacts in a vehicle magnetic connector and holds the connectors together during an EV charging process. As the term is used herein "magnetic" refers to magnetic attraction that may be generated by permanent magnets or by electromagnets.

In some embodiments, the electrical connector apparatus includes automatic coupling means that comprise magnets alone, or magnets for initial alignment followed by a mechanical coupling, such as a bayonet connector, threaded coupling, cam or latch.

In some embodiments, the automatic coupling means have funneling shapes on one or both of the suspended magnetic connector and the vehicle magnetic connector to aid the coming together of the connector surfaces during the initial alignment.

In some embodiments, the electrical contacts in the suspended magnetic connector includes pins that retract into the connector housing when not connected to the vehicle magnetic connector as a safety measure.

In some embodiments, the electrical contacts in the vehicle magnetic connector are made of corrosion-resistant materials, such as stainless steel.

BRIEF DESCRIPTION OF THE DRAWINGS

Further advantages are apparent by reference to the detailed description in conjunction with the figures, wherein elements are not to scale so as to more clearly show the details, and wherein.

DETAILED DESCRIPTION

Figure 1:
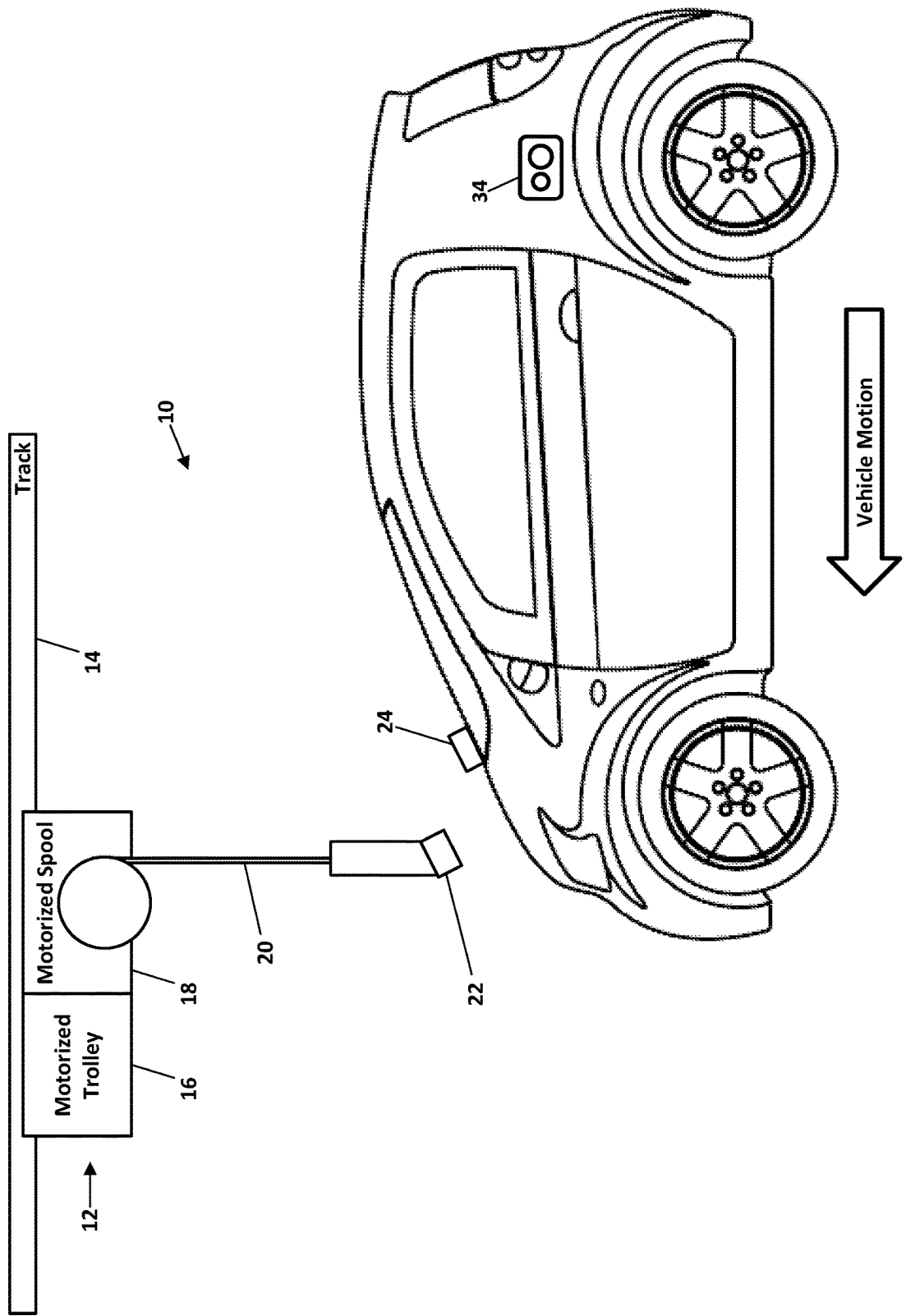
FIG. 1 depicts the physical configuration of an EV charging system according to an embodiment of the invention.

As depicted in FIG. 1, a preferred embodiment of an EV charging system 10 includes a motorized or manually-adjusted alignment apparatus 12, such as a trolley and track system, mounted on the ceiling of a residential garage. In most installations, the track 14 is oriented to allow the trolley 16 to move side-to-side in the garage, in a direction perpendicular to the direction of travel of the vehicle. In one embodiment, a motorized spool 18 attached to the trolley dispenses and retracts an electric cable 20. A suspended magnetic connector 22 is suspended from the cable 20. The flat lower surface of the suspended magnetic connector 22 includes magnets and flat plug-less electrical contacts.

In an alternative embodiment, a polar coordinate system is implemented instead of a trolley and track. In the polar system, a rotational adjustment, such as using a motor, is provided at the center, and a length adjustment, such as using a worm gear, is provided to travel a distance from the center.

In another embodiment, the cable 20 is suspended from the trolley at a fixed length that may be manually adjustable. For safety, this embodiment may include a secondary plug-in style connector pair in the cable that can break apart if needed. In yet another embodiment, the length of the cable 20 is fixed, and attached to the cable, at approximately half its length, is a string or wire that is spooled from the trolley or the ceiling. In this configuration, the connector may be raised out of reach when not in use, and lowered into place for use by gravity.

A vehicle magnetic connector 24 is attached to an upper surface of the electric vehicle, such as the windshield, hood or roof. The flat upper surface of the vehicle magnetic connector 24 includes magnets and electrical contacts, which may be flat and plug-less, that align with the mating contacts on the lower surface of the suspended magnetic connector 22. The magnets in the suspended magnetic connector 22 and the vehicle magnetic connector 24 are configured in such a way as to allow only correct alignment of the mating electrical contacts in the two connectors. Preferably, the parallel mating surfaces of the suspended magnetic connector 22 and the vehicle magnetic connector 24 are each positioned at a slight angle to allow for some sliding contact of their surfaces before the magnets engage to provide the final alignment.

In some embodiments, the magnets in the suspended magnetic connector 22 and the vehicle magnetic connector 24 provide an initial magnetic attraction to align the connectors initially and then a secondary connection, such as a bayonet connector, threaded connector, cam, magnets, or other latching mechanism, engages automatically to securely hold them together.

Figure 2:
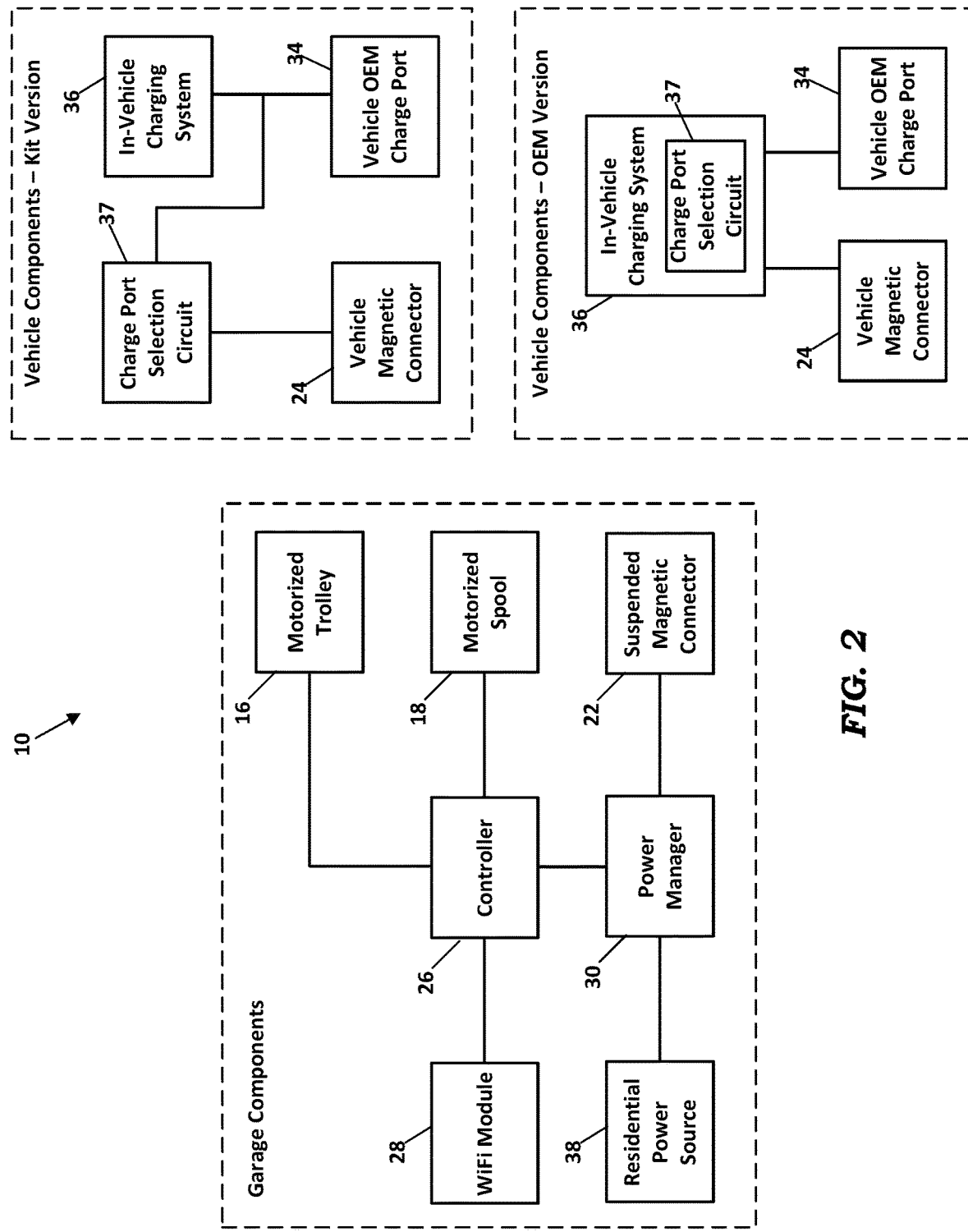
FIG. 2 depicts an electrical block diagram of the EV charging system according to an embodiment of the invention.

As shown in FIG. 2, a preferred embodiment of the system 10 comprises garage components and vehicle components. The garage components include the residential power source 38, a controller 26 that is in communication with a Wi-Fi module 28, a power manager 30, the motorized trolley 16, the motorized spool 18, and the suspended magnetic connector 22.

The controller 26 is programmed to automate the movement of the trolley 16 and the spool 18 in response to input signals received by the Wi-Fi module 28, such as from a smart phone. The controller 26 may also manage communication and safety features.

The power manager 30 communicates with the controller 26 to perform at least the following functions in the connection of the residential power source 38 to the suspended magnetic connector 22:
  on/off control for the flow of power;
  galvanic isolation between the residential power source 38 and the suspended magnetic connector 22;
  safety; and
  indication of ampacity of the residential power 38.

One embodiment depicted in the top right of FIG. 2 provides an add-on kit for use in vehicles having standard factory-installed charging connectors, such as a J1772 connector for AC charging and a CCS1 connector for DC charging. The vehicle components include the vehicle magnetic connector 24, the vehicle OEM charge port 34, the in-vehicle charging system 36, and the charge port selection circuit 37. In this kit embodiment, the vehicle magnetic connector 24 is electrically connected to the charge port selection circuit 37 which is connected to the vehicle's wiring that connects the vehicle OEM charge port 34 to the in-vehicle charging system 36. The connection between the vehicle magnetic connector 24 and the charge port selection circuit 37 may be a combination of a flat ribbon conductor and traditional wiring. In an alternative embodiment depicted in the bottom right of FIG. 2, the vehicle magnetic connector 24 is an OEM component that is factory-wired directly to the vehicle's charging system 36 that incorporates the charge portion selection circuit 37 as an OEM component.

In both embodiments, the charge port selection circuit 37 selects the vehicle OEM charge port 34 as the primary charging port, and selects the vehicle magnetic connector 24 as a secondary charging port only when it is in use. This prevents the simultaneous use of both charging ports on the vehicle. The charge port selection circuit 37 may use the open/closed state of a door or cover over the vehicle OEM charge port 34 as an input.

Figure 3:
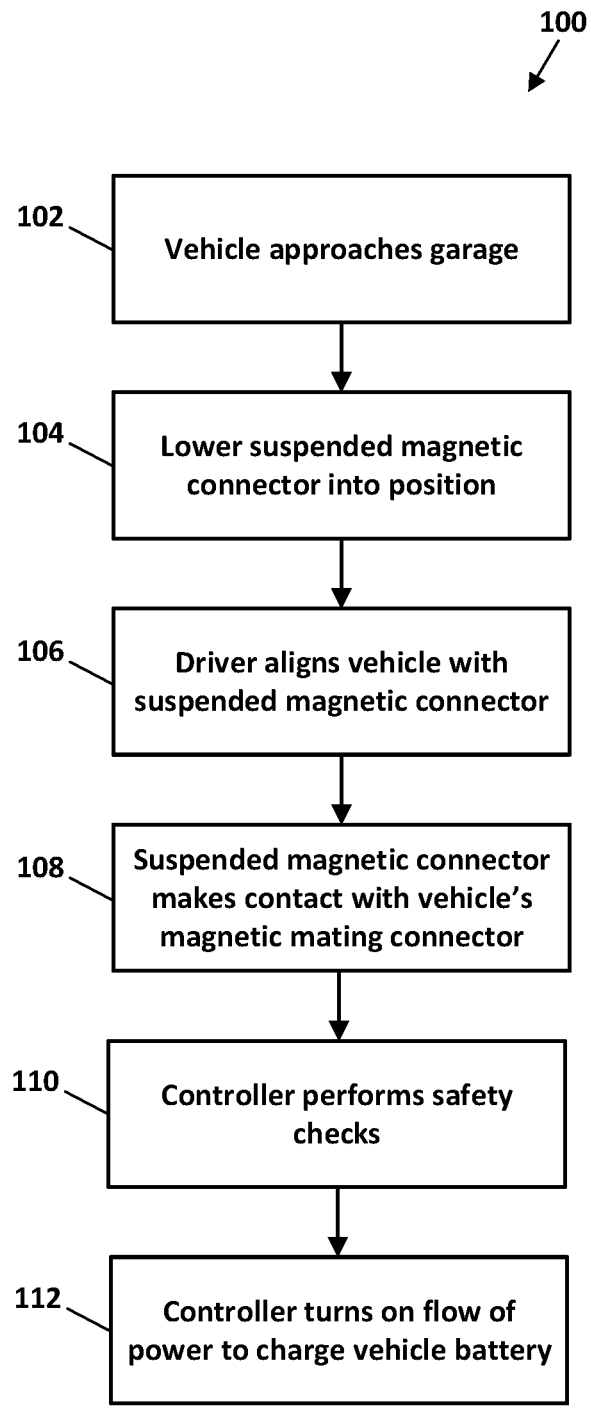
FIG. 3 depicts a process for aligning and connecting a vehicle magnetic connector to a suspended magnetic connector to commence EV charging.

As depicted in FIG. 3, a preferred embodiment of the system is configured to enable a process 100, so that as the vehicle approaches the garage (step 102), the motorized spool 18 dispenses the electric cable 20 from overhead and lowers the suspended magnetic connector 22 to a defined height above the floor of the garage (step 104). As the moving vehicle enters the garage, the driver aligns the vehicle using the visual feedback provided by the suspended magnetic connector 22 (step 106). When properly positioned, magnetic attraction brings the suspended magnetic connector 22 into contact with the vehicle magnetic connector 24 indicating to the driver to stop the vehicle (step 108). Once the connectors are properly mated, and after a sequence of safety checks (step 110), a controller allows the flow of power to charge the battery (step 112).

Figure 4:
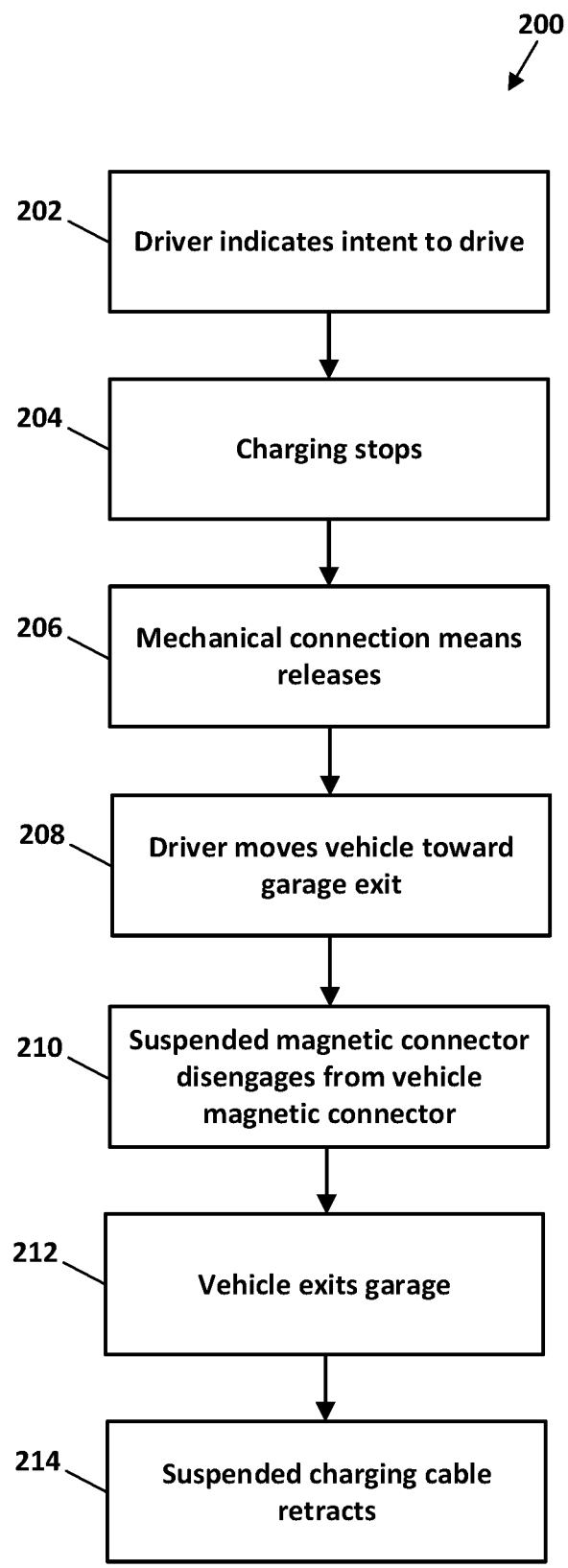
FIG. 4 depicts a process for disconnecting a vehicle magnetic connector from a suspended magnetic connector to discontinue EV charging.

As depicted in FIG. 4, a preferred embodiment of the system is configured to enable a process 200 for disconnecting the vehicle magnetic connector 24 from the suspended magnetic connector 22 to discontinue EV charging as the vehicle prepares to exit the garage. When the driver indicates an intent to drive the vehicle (step 202), charging stops (204). The intent to drive the vehicle may be indicated by pressing the brake pedal (if the vehicle magnetic connector 24 is a component of an add-on kit) or by taking the vehicle out of Park (if the vehicle magnetic connector 24 is an OEM component). After charging stops, the mechanical means for securing the vehicle magnetic connector 24 to the suspended magnetic connector 22 releases, such that only the magnetic attractive force keeps the two connectors together (step 206). As the driver moves the vehicle toward the garage exit (step 208), the magnetic attractive force is overcome and the suspended magnetic connector 22 disengages from vehicle magnetic connector 24 (step 210). In various embodiments, the magnetic attractive force between the two connectors is overcome by (1) a mechanical pulling force, (2) inducing a magnetic field of an opposite polarity in an electromagnetic connector, or (3) removing power from an electromagnetic connector. The vehicle is then free to exit the garage (step 212). In some embodiments, the suspended charging cable 20 may then be automatically retracted by the motorized spool 18 (step 214).

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated.

The invention claimed is:

1. An apparatus for safely and accurately connecting a power source to an electrical connector on a vehicle as a driver parks the vehicle to begin a charging process, the apparatus comprising:
   a charging cable suspended above the vehicle that is electrically connected to the power source;
   a suspended magnetic connector that is electrically connected to the charging cable and suspended above the vehicle in a position that is visible to the driver while parking the vehicle to aid the driver in visually aligning the suspended magnetic connector with a vehicle magnetic connector;
   the vehicle magnetic connector being on the vehicle and configured to align with and make contact with the suspended magnetic connecter by magnetic attraction;
   an electrical circuit for detecting proper electrical contact of the suspended magnetic connector with the vehicle magnetic connector; and
   one or both of a visual connection status indicator and an audible connection status indicator to alert the driver, while the driver is parking the vehicle, of verification of proper electrical contact of the suspended magnetic connector with the vehicle magnetic connector.

2. The apparatus of claim 1 wherein the electrical circuit verifies proper electrical contact through a pre-charge check of ohmic contact resistance in current-carrying conductors in the charging cable and a safety ground conductor.

3. The apparatus of claim 1 wherein the connection status indicator is integrated into one or both of a vehicle dashboard and a vehicle audio system.

4. The apparatus of claim 1 wherein the connection status indicator is provided at the suspended magnetic connector.

5. The apparatus of claim 1 further comprising one or both of a visual charge status indicator and an audible charge status indicator to alert the driver that charge current is flowing.

6. The apparatus of claim 5 wherein the charge status indicator includes an alarm indicating that charging has failed.

7. The apparatus of claim 1 further comprising a safety circuit to interrupt charging based on contacts in the suspended magnetic connector or the vehicle magnetic connector heating beyond an expected range.

8. The apparatus of claim 1 further comprising a detection circuit to interrupt charging based on the suspended magnetic connector or the vehicle magnetic connector being physically bumped, so as to prevent sparking and exposure of live conductors that would otherwise result when the connectors separate during the charging process.

9. The apparatus of claim 1 wherein the power source comprises a power outlet in a ceiling of a garage in which the apparatus is installed.

10. The apparatus of claim 1 wherein the charging cable includes an inline plug-in-socket electrical connector that mechanically disconnects if a downward pulling force is applied to the suspended magnetic connector.

11. The apparatus of claim 1 further comprising an actuated cover for the vehicle magnetic connector that automatically closes to protect the vehicle magnetic connector from exposure to weather when not connected to the suspended magnetic connector.

12. The apparatus of claim 1 further comprising a fault current limiting circuit disposed within the vehicle as a safety measure.

13. The apparatus of claim 1 further comprising a charge port selection circuit for selecting an original equipment manufacturer (OEM) charge port on the vehicle as a primary charging port, and for selecting the vehicle magnetic connector as a secondary charging port only when it is in use, thereby preventing the simultaneous use of both charging ports on the vehicle.

14. An electrical connector apparatus that magnetically aligns electrical contacts during a charging process for a vehicle, comprising:
 a charging cable suspended above the vehicle that is electrically connected to a power source;
 a suspended magnetic connector that is electrically connected to the charging cable and suspended above the vehicle, the suspended magnetic connector having a mating surface in which first electrical contacts are disposed;
 a vehicle magnetic connector on the vehicle that is configured to align with and make contact with the suspended magnetic connecter by magnetic attraction, the vehicle magnetic connector having a mating surface in which second electrical contacts are disposed; and
 funneling shapes on one or both of the suspended magnetic connector and the vehicle magnetic connector to assist in initial alignment of the suspended magnetic connector and the vehicle magnetic connector as the mating surfaces of the vehicle magnetic connector and the suspended magnetic connector make sliding contact,
 wherein the first electrical contacts make electrical connection to the second electrical contacts as the suspended magnetic connector and the vehicle magnetic connector are held together by magnetic attraction during the charging process.

15. The electrical connector apparatus of claim 14 further comprising automatic coupling means that comprise:
 magnets in the suspended magnetic connector and the vehicle magnetic connector, or
 magnets in the suspended magnetic connector and the vehicle magnetic connector that provide initial alignment and a mechanical coupling that provides a secure connection of the suspended magnetic connector to the vehicle magnetic connector, wherein the mechanical coupling comprises one or more of a bayonet connector, threaded coupling, cam and latch.

16. The electrical connector apparatus of claim 14 wherein the second electrical contacts in the vehicle magnetic connector are made of corrosion-resistant materials, such as stainless steel.

17. The electrical connector apparatus of claim 14 wherein the first electrical contacts in the suspended magnetic connector comprise pins that retract into a housing of the suspended magnetic connector when not connected to the vehicle magnetic connector as a safety measure.

18. A process for aligning a vehicle charging connector on a vehicle to a suspended charging connector in a garage while the vehicle is driven into the garage, the process using the apparatus of claim 1 and comprising:
 lowering the suspended magnetic connector into position to contact the vehicle magnetic connector within the garage;
 driving the vehicle into the garage while aligning the suspended magnetic connector with the vehicle magnetic connector;
 the suspended magnetic connector contacting the vehicle magnetic connector;
 the electrical circuit detecting proper electrical contact of the suspended magnetic connector with the vehicle magnetic connector; and
 the electrical circuit providing power to the suspended magnetic connector based on detection of proper electrical contact.

19. The apparatus of claim 1 wherein the suspended magnetic connector is disposed at a slight angle that matches a slight angle of the vehicle magnetic connector to allow for sliding contact of surfaces of the suspended magnetic connector and the vehicle magnetic connector before magnets in the suspended magnetic connector engage magnets in the vehicle magnetic connector to provide a final alignment.

20. The apparatus of claim 14 wherein the suspended magnetic connector is disposed at a slight angle that matches a slight angle of the vehicle magnetic connector to allow for the sliding contact of the mating surfaces of the suspended magnetic connector and the vehicle magnetic connector before magnets in the suspended magnetic connector engage magnets in the vehicle magnetic connector to provide a final alignment.

* * * * *